US012750440B2

(12) United States Patent
Rottenkolber

(10) Patent No.: US 12,750,440 B2
(45) Date of Patent: Sep. 29, 2026

(54) METHOD AND SERVER SYSTEM FOR COUPLING A TERMINAL OF A USER TO SMART GLASSES OF A COMMUNICATION DEVICE OF A CALL PARTNER

(71) Applicant: AUDI AG, Ingolstadt (DE)

(72) Inventor: Tobias Rottenkolber, Kösching (DE)

(73) Assignee: AUDI AG, Ingolstadt (DE)

( * ) Notice: Subject to any disclaimer, the term of this patent is extended or adjusted under 35 U.S.C. 154(b) by 788 days.

(21) Appl. No.: 18/248,650

(22) PCT Filed: Sep. 6, 2021

(86) PCT No.: PCT/EP2021/074529
§ 371 (c)(1),
(2) Date: Jun. 1, 2023

(87) PCT Pub. No.: WO2022/078674
PCT Pub. Date: Apr. 21, 2022

(65) Prior Publication Data

US 2023/0412720 A1 Dec. 21, 2023

(30) Foreign Application Priority Data

Oct. 12, 2020 (DE) ..................... 10 2020 126 693.6

(51) Int. Cl.
*H04M 1/72409* (2021.01)
*G02B 27/01* (2006.01)

(52) U.S. Cl.
CPC .... *H04M 1/724097* (2022.02); *G02B 27/017* (2013.01); *G02B 2027/0178* (2013.01)

(58) Field of Classification Search
CPC ........... H04M 1/724097; G02B 27/017; G02B 2027/0178; G06Q 30/0613
See application file for complete search history.

(56) References Cited

U.S. PATENT DOCUMENTS

2005/0080786 A1* 4/2005 Fish .................... G06F 16/9537
2011/0028132 A1* 2/2011 Bos ....................... H04W 4/029
455/414.2

(Continued)

FOREIGN PATENT DOCUMENTS

DE 102012214902 A1 2/2014
DE 102018201711 A1 * 3/2018 ............. G06F 3/011

(Continued)

OTHER PUBLICATIONS

International Search Report and Written Opinion of the International Searching Authority directed to related International Patent Application No. PCT/EP2021/074529, mailed Dec. 21, 2021, with attached English-language translation; 16 pages.

(Continued)

*Primary Examiner* — Angelica Perez
(74) *Attorney, Agent, or Firm* — Sterne, Kessler, Goldstein & Fox P.L.L.C.

(57) ABSTRACT

The invention relates to a method for coupling a terminal of a user to smart glasses of a communication device of a call partner, the method comprising the following steps: providing an Internet page with a control element for establishing contact; detecting an operation activity by the user on the control element; detecting a geographic device position (POS) of the terminal; selecting the call partner from a plurality of possible call partners based on a selection criterion which evaluates the device position; contacting the communication device of the call partner; and, if an acknowledge confirmation of the call partner is received from the communication device, coupling the terminal to the smart glasses via a communication channel by means of a management server.

9 Claims, 2 Drawing Sheets

(56) References Cited

U.S. PATENT DOCUMENTS

Figure 1:
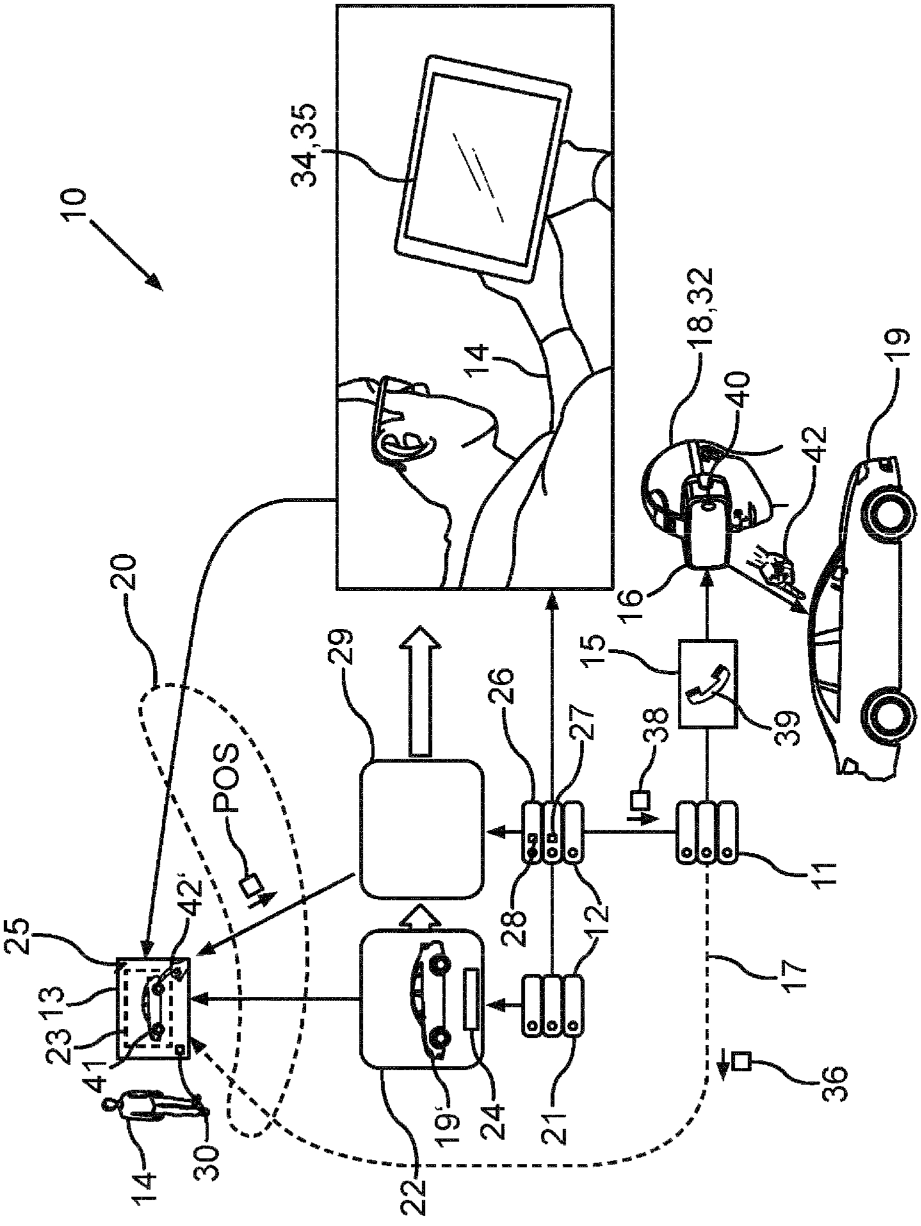

| | | | | |
|---|---|---|---|---|
| 2014/0058894 | A1* | 2/2014 | Hohenacker | G06Q 30/0613 705/26.41 |
| 2015/0338234 | A1* | 11/2015 | Seastrom | G01C 21/3679 701/409 |
| 2017/0046406 | A1* | 2/2017 | Ganesan | G06F 16/248 |
| 2017/0316418 | A1* | 11/2017 | Sarin | H04W 4/24 |
| 2019/0139113 | A1 | 5/2019 | Andropov et al. | |
| 2022/0277043 | A1* | 9/2022 | Kowalski | G06F 16/906 |

FOREIGN PATENT DOCUMENTS

| | | | |
|---|---|---|---|
| EP | 2701115 | A1 | 2/2014 |
| WO | WO 2015159276 | A1 | 10/2015 |

OTHER PUBLICATIONS

Communication of the Authority In Charge of International Preliminary Examination regarding informal discussions with the applicant directed to International Patent Application No. PCT/EP2021/074529, mailed May 11, 2022, with attached English-language translation; 9 pages.

International Preliminary Report on Patentability directed to related International Patent Application No. PCT/EP2021/074529, completed Jan. 18, 2023, with attached English-language translation; 14 pages.

* cited by examiner

METHOD AND SERVER SYSTEM FOR COUPLING A TERMINAL OF A USER TO SMART GLASSES OF A COMMUNICATION DEVICE OF A CALL PARTNER

TECHNICAL FIELD

The present disclosure relates to a method for coupling a terminal of a user to smart glasses of a communication device of a call partner so that the user can communicate with the call partner via the smart glasses, thus, for example, can receive image data of the smart glasses and have them displayed on their terminal and, for example, can thereby reproduce voice signals from a microphone of the smart glasses, and can themselves capture voice signals via a microphone of the terminal and send these to the communication device of the call partner. The present disclosure also comprises a server system with at least one server computer in order to implement the method according to the present disclosure.

BACKGROUND

In DE 10 2018 201 711 A1, the service provider Vypii GmbH provides a solution with which a digital, video-based real-time communication (Live Consultation) is possible via smart glasses. This solution can be used, for example, for digital consulting during vehicle sales. A potential customer thus is spared a visit to a car dealership and is flexible in terms of time. The employee of the car dealership hereby wears smart glasses with which they can have information about the vehicle displayed. At the same time, via the integrated camera of the smart glasses, the customer also sees what the adviser sees through the spectacles. A conversation between customer and adviser can be transmitted via microphones and loudspeakers.

Until now, there has been the path of making an appointment via a web page or Internet page of a car dealer, and the possibility of a spontaneous visit. The transmission of a pairing code from the smart glasses takes place in each case so that the potential customer can identify and request the camera image stream of the smart glasses and can speak to the adviser via their smart glasses. A vehicle manufacturer can thus provide a product portfolio with images and information regarding a vehicle on an Internet web page, and offer the possibility of contacting an adviser via a dealer search function.

The live consultation via smart glasses is possible only via the web page and via what is known as the spontaneous visit (with pairing code). The customer thus must still arrange an appointment with a requested adviser in the described manner for the real-time communication, or call up the adviser and have the pairing code communicated, for example by e-mail.

The contacting thus requires that a plurality of communication media (web page for dealer contact information, and telephone or e-mail for the communication of the pairing code) are additionally available to the customer so that a communication connection via the smart glasses of the adviser actually takes place.

Another method for live video consultation is known from DE 10 2012 214 902 A1. In this system, multiple advisers can sit ready for the consultation, and if a customer signals a request for advice, one of the advisers is selected and connected to the customer via a live video stream. In the system, it is not taken into account that the customer would possibly like to visit the adviser again in person at a later date, for which a travel route may not be too long.

A real-time sales platform for motor vehicles is known from US 2019/0 139 113 A1, which enables a customer to at least perform purchase inquiries anonymously. The transmission of a data stream of a pair of smart glasses is not hereby provided.

The present disclosure is based on the object of providing the establishment of a communication connection, between a terminal of a potential customer on the one hand and a smart glasses of an adviser on the other hand, for a live consultation (conversation about a product and associated product presentation).

BRIEF DESCRIPTION OF DRAWINGS/FIGURES

Figure 2:
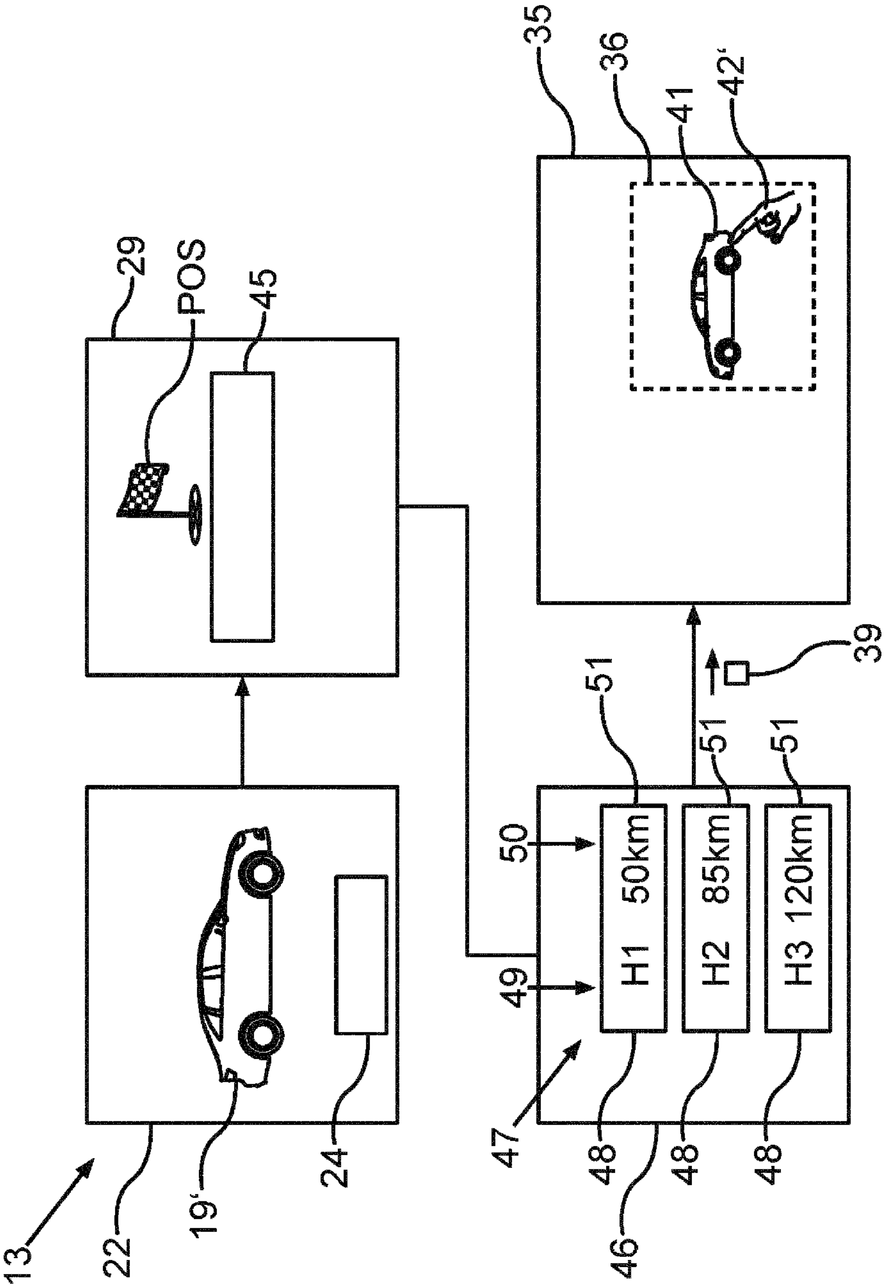

FIG. 1 a schematic representation of an embodiment of the server system according to the present disclosure; and FIG. 2 a drawing to illustrate a sequence of Internet pages as can be presented on a user's terminal via an embodiment of the method according to the present disclosure.

DETAILED DESCRIPTION

The object is achieved by the objects of the independent claims. Advantageous embodiments of the present disclosure are described by the dependent claims, the following description, and Figures.

The present disclosure provides a method for coupling a terminal of a user with smart glasses of a communication device of a call partner. The method includes the following steps:

- providing an Internet page or web page with a control element for a establishing contact;
- detecting an operating activity by the user on the control element;
- detecting a geographical device position of the terminal;
- selecting the call partner from a plurality of predetermined possible call partners based on a selection criterion which evaluates the device position;
- contacting the communication device of the call partner; and
- in the event that an acknowledge confirmation of the call partner is received from the communication device, coupling the terminal to the smart glasses via a communication channel (Internet stream) by means of a management server.

A personal computer (PC) or a tablet PC or a smartphone can hereby be provided as the terminal. The communication device to which the smart glasses can be connected or which can be formed by the smart glasses can likewise be a personal computer (PC) or a computer integrated into the glasses. In addition to the control element, the Internet page or web page which is provided for triggering the contacting can display or comprise information regarding a specific product, so that the user sees the information regarding the product on the Internet page and can thereupon initiate the contacting of the call partner by means of the control element. The call partner can be, for example, an adviser for the product. The next best or next available call partner is hereby not selected; rather, a geographical relationship between the device position on the one hand and the position of the possible call partner is also taken into account by the selection criterion. A call partner can thus be selected in the (spatial) vicinity, which can be defined or specified by setting the selection criterion. The actual establishment of the communication channel can take place via a management server, which can then operate the communication channel as a video stream or general data stream between the smart glasses on the one hand and the terminal of the user on the other hand. The remaining method steps can likewise be performed by the management server or preferably by at least one other server computer, which will be described further. Said acknowledge confirmation can, for example, be generated by the communication device in the event that the call partner presses an acknowledge button or executes another predetermined operating action.

Via the present disclosure, the advantage results that a user needs only to operate the control element on the Internet page in the event that they decide on a call, and, starting from this, a suitable call partner suitable with respect to the device position is selected for him, and the communication channel is established between the user's terminal and the smart glasses of the call partner. The user can thus be able to view or be presented with the Internet page on their terminal so that they only need to operate this one terminal in order to be able to request or establish the communication channel.

The present disclosure also comprises embodiments via which additional advantages result.

One embodiment comprises that the aforesaid selection criterion is based on a coverage information of each possible call partner, pertaining to their area of coverage, and/or the least distance between the device position and the call partner, and/or a selection by the user from a list that indicates at least some of the possible call partners.

By establishing a coverage of each possible call partner for each area of coverage, the advantage results that no circular or radius-dependent selection must be made; rather, any geometry of the coverage area can be selected and, nevertheless, whether the device position is within this coverage area can be checked in order to identify or select the associated call partner. The determination of the least distance has the advantage that a possible journey of the user to the call partner, or of the call partner to the user, is minimized. By providing a list and selection according to the selection on the part of the user, the advantage results that the user can specify personal preferences which are then taken into account in selecting the possible call partner. The aforesaid list of possible call partners can, for example, be limited to those call partners whose distance from the device position is less than a predetermined maximum value, for example all call partners within a radius of 200 km or within a radius of 100 km, to name only examples.

One embodiment comprises that the device position is determined from an IP address of a feed server which couples the terminal to the Internet, and/or from geoposition data of a device-side receiver for a position signal of a GNSS, and/or from a position input of the user. In order to detect the device position, the IP address (IP—Internet Protocol) with which messages of the terminal are provided in order to signal the sender can thus be evaluated given an Internet connection. The evaluation of geoposition data of a receiver of the position signal of a GNSS (global navigation satellite system), for example the GPS (Global Positioning System), can even enable a specification of the device position that is precise to the meter. The position input can also be requested by the user; for example, the user can be asked to indicate a postal code for the device position. The position input of a user has the advantage that the user can also specify a position that differs from the current position of the device so that the user can, for example, use his home address even if they are not at home.

One embodiment comprises that, in the selection criterion, the distance takes into account a geometric distance and/or travel duration. In relation to the distance as a selection criterion, a route length and/or travel duration can thus also be taken into account, wherein the travel duration can additionally also take into account, for example, traffic data relating to traffic density on the travel route.

One embodiment comprises that, after selecting the call partner and before contacting their communication device, a predetermined decision duration is waited for during which a return control element is displayed to the user on their terminal and, upon detecting an actuation of the return control element on the part of the user, contacting does not occur, and otherwise contacting only takes place after the expiry of the decision duration. Thus, after the user has actuated the control element, the call partner, that is to say their communication device, is not immediately contacted; rather, a decision duration is waited for which can be, for example, in a range between 5 seconds and 25 seconds. During the decision duration, the user can still terminate or cancel or interrupt the establishing of contact by means of the return element. This reduces the number of accidental triggerings that can otherwise result given operation by inexperienced users.

One embodiment comprises that the possible call partners are ordered according to the selection criterion and, in the event that the acknowledge confirmation of the contacted call partner is absent for a predetermined waiting period, a next call partner is selected according to the ordering and their communication device is contacted. It is hereby avoided that, given a failed contact with the first or first selected call partner, the user has unsuccessfully actuated the control element. If a call partner does not answer the telephone or the communication device, or rejects the contact outreach, a next call partner in accordance with the ordering is listed for the user or is contacted for the user. The ordering can, for example, be based on the distance of each call partner from the device position, wherein the nearest call partner is listed first.

One embodiment comprises that the steps from providing the Internet page up to the detection of the operation activity are performed by a web server different than the management server, and/or at least one further Internet page is provided with a control element for establishing contact, wherein the Internet pages pertain to different call subjects, and for each Internet page a different set or group of possible call partners is provided. In addition to the management server, at least one further server computer can thus be provided as a web server, wherein each or at least some of such web servers can operate an Internet page with the described control element for establishing contact. Thus, Internet pages can be presented for different call subjects, for example different products, and the management server can be controlled by the different web servers to the effect that it establishes or mediates, respectively, the described communication channel between a selected call partner (i.e. their communication device with smart glasses) and a terminal of each user who operates each Internet page. Thus, the management server can be used for different web servers as a mediator for establishing communication channels.

One embodiment comprises that, after receiving the acknowledge confirmation, this is signaled to users by means of a message of the management server before the communication channel is connected to the terminal. In the event that a call partner is contacted by the management server, thus the communication device signals a contact outreach to the call partner and the call partner confirms this, for example via an input at a key or by actuating the smart glasses, the user can already be signaled in advance—thus before the communication channel is established and the camera image of the smart glasses and/or the speech signal is available to the user in the described manner—via the acknowledge confirmation again that the establishment of a communication channel is impending. It is hereby clear to the user that the contact outreach was successful, even when the establishing of the communication channel still takes a predetermined period of time.

The present disclosure also provides server system with at least one server, wherein the at least one server is designed as a management server for operating a communication channel between a smart glasses and a terminal, and overall the at least one server is configured to implement a method according to any of the preceding claims. Here a single computer or a computer network which can be connected to the Internet is designated as a server.

Each server of the server system can have a data processing device or a processor device which is configured to implement the method steps of an embodiment of the method according to the present disclosure as they relate to each server. For this purpose, the processor device can have at least one microprocessor, and/or at least one microcontroller, and/or at least one FPGA (field programmable gate array), and/or at least one DSP (digital signal processor). Furthermore, the processor device can comprise program code which is configured to implement the aforesaid method steps when executed by the processor device. The program code can be stored in a data storage device of the processor unit.

The present disclosure also comprises the combinations of the features of the described embodiments. The present disclosure therefore also comprises implementations which each have a combination of the features of a plurality of the described embodiments, provided the embodiments have not been described as mutually exclusive.

In the following, exemplary embodiments of the present disclosure are described. Shown are:

FIG. 1 a schematic representation of an embodiment of the server system according to the present disclosure; and FIG. 2 a drawing to illustrate a sequence of Internet pages as can be presented on a user's terminal via an embodiment of the method according to the present disclosure.

The exemplary embodiments described below are preferred embodiments of the present disclosure. In the exemplary embodiments, the described components of the embodiments each represent individual features of the present disclosure that are to be considered independently of one another, each also further developing the present disclosure independently of one another. For this reason, the disclosure is also intended to include other combinations of the features of the embodiments than those described. Additionally, the described embodiments can also be complemented by additional, already described features of the present disclosure.

In the figures, the same reference signs refer to functionally identical elements.

FIG. 1 shows a server system 10 which can comprise a management server 11 and, by way of example, two web servers 12 for providing Internet pages or web pages. Via the server system 10, a terminal 13 of a user 14 on the one hand and a communication device 15 with smart glasses 16 on the other hand can be coupled or connected via a communication channel 17. The user 14 can hereby communicate with a call partner 18 who, for example, can be a dealer or an adviser for a product 19. The product 19 can be a motor vehicle, for example. The call or the communication between the user 14 and the call partner 18 can take place via the Internet 20, that is to say the user 14 does not need to visit the call partner 18. Instead, a field of view or a perspective of the call partner 18 can be displayed to the user 14 by means of a camera of the smart glasses 16, and an audio or voice connection (for example VoIP— voice over IP) is thereby operated between the user 14 and the call partner 18.

The user can instead, with his terminal 13, retrieve a webpage or Internet page 22 from one of the web servers 12, for example a manufacturer web server 21, for which purpose they can use, for example, a network browser or Internet browser 23 which can be operated by the terminal 13. Such an Internet browser 23 is known per se, for example as the product Chrome or Firefox or Edge. For this purpose, the terminal 13 can be, for example, a mobile terminal or a personal computer or a tablet PC. The Internet page 22 can display at least one image 19' of the product 19, for example as a photograph. In addition, a control element 24 can be provided which the user 14 can actuate on the terminal 13, for example on a screen or on a touchscreen 25 which displays the Internet page 22. The control element 24 can, for example, be a touch surface which detects a finger input or a clicking of a mouse pointer. A further web server 26 can contain a selection list 27 of possible call partners, wherein the call partner 18 can also be listed or their contact data can be contained in the selection list 27. By means of a selection criterion 28, one of the listed parties can be selected from the selection list 27 as a desired call partner 18. After clicking the control element 24, an Internet webpage or an Internet page 29 can be provided by the web server 26 or transmitted to the terminal 13, via which a device position POS of the user 14 can be queried.

The device position POS of the terminal 13 can hereby be queried directly by a receiver 30 for a position signal of a GNSS, or the user 14 can, for example, input a position specification, for example a postal code, on the Internet page 29 at the terminal 13. Based on the device position POS and the selection list 27, the call partner 18 can then be selected who is then selected as an adviser 32 for the user. The user 14 therefore represents a potential customer for the purchase of the product 19. A communication window 35 can then be provided on a further webpage or Internet page 34 on the terminal 13, so that the user 14 can receive a video stream 36 on the terminal 13 via the communication channel 17.

The communication channel 17 can be established or generated in that corresponding contact data 38 of the selected call partner 18 are signaled to the management server 11 based on a selection that was made via the selection criterion 28, which management server can contact the communication device 15 of the call partner 18 in order to provide the communication channel 17 between the smart glasses 16 and the terminal 13. If the call partner 18 receives or accepts the contact outreach 39, the video stream 36 of a camera 40 of the smart glasses can be transmitted via the communication channel 17 to the terminal 13, where what the call partner 18 sees through the smart glasses 16 can be displayed in the communication window 35 on the Internet page 34. For example, if the call partner 18 views the product 19, the corresponding camera image 41 of the product 19 can be displayed via the video stream 36. The fact that this is a live consultation is shown symbolically in FIG. 1 in that a hand 42 of the call partner 18 is also shown in the camera image as a hand illustration 42'.

The web pages or Internet pages 22, 29, 34 can, for example, be implemented based on HTML (HyperText Markup Language) and/or by means of JS (JavaScript), to name only examples for the realization of web pages.

FIG. 2 shows a possible sequence of web pages as can result on the terminal 13 via the operation of the control element 24. An illustration 19' of the product 19 and the control element 24 for triggering or starting the establishment of contact can be shown on the Internet page 22. If the control element 24 is operated, the device position POS can be determined by the Internet page 29, which can take place, for example, by querying 45 a postal code or by measuring the geo-position of the terminal 13. On a further Internet page 46, a result list 47 of possible selected call partners 48 can be displayed, wherein in each case an adviser name 49 and the indication of a distance 50 between the determined device position POS and each adviser can be provided by way of example.

This can be shown in each case as a control element 51, so that the user 14 can select an adviser by operating each control element. The establishing of contact 39 thereupon takes place according to the results list 47, and an adviser who responds can, by means of the communication window 35, have the video stream 36 displayed in the communication window 35 at the terminal 13 of the user 14 in order to present the camera image 41 of the product 19. In the communication channel 17, a call connection can also be provided, for example by means of VoIP, so that the user 14 and the call partner 18 can have a conversation.

The aim of the achievement is to provide a further information source for the potential customer on the Internet page of a web server of a manufacturer of a product, e.g. a motor vehicle. A control element for a jump can be integrated per vehicle derivative into an Internet page, in order to be able to digitally advise the customer in a vehicle-specific manner. The idea can be developed according to the principle of Anonymous, Instantaneous & Now. The customer goes onto the webpage of the manufacturer, selects a vehicle, and clicks on the link of the live consultation (control element). A new window and/or a new Internet page opens, which can already, but does not need to, represent a connection to a further web server. After a location determination of a device position or inputting of a customer's postal code, the participating advisers are displayed as possible call partners for the requested vehicle. The customer now selects an adviser from the list, or a distance between the device position and the site or whereabouts of each adviser can form the basis of a selection criterion.

A next Internet page can explain the live consultation and display the current status of the contact outreach. The customer can now wait a consideration time with a decision duration of, for example, 15 seconds, in order to consider whether they really would like to have the consultation now or, for example, would rather make an appointment, which the customer can signal by actuating a displayed return control element, for example a button to click. After the decision duration and without detecting an operation of the return control element, a telephone server as a management server can be activated, and a call can be triggered to the telephone number stored by the adviser. If no one answers the telephone or the number 0 is pressed (decline call), the next adviser is called. Should none of the selected advisers answer or if 0 is always pressed, the customer can be directed to arrange an appointment. If, instead, one of the advisers presses the number 1 to answer, for example, the status for the customer changes. The adviser puts on the smart glasses and initiates the live consultation with the customer. The communication channel required for this can provide a VoIP connection (VoIP— Voice over IP) for call transmission.

The idea thus relates to the mechanism of notification for new requests. Users of each terminal can request a live consultation directly as customers, without specifying personal data, and can start after acceptance by the adviser.

As advantages, this hereby results in:

New channel for customers as an information source: A digital consultation is a substantial gain for the expansion of eCommerce routes. From calls with an online vehicle purchase, it has been shown that, for a product like ours, the customers in most instances seek contact by telephone in order to clarify last questions of details before the online purchase.

Faster purchase decision Via the personal consultation with a sales adviser/adviser, open questions are clarified in more targeted manner and a certain basis for trust is achieved.

Flexible scheduling: The customer is spared making an appointment with the car dealership and the drive. They can themselves decide, within the office hours, when and from where they start the consultation.

Location-independent: In spite of the well-developed adviser network of a country, the customer would need to travel a certain distance for an on-site appointment. Only an Internet connection is required for a live consultation.

Integration of the business with its advisers on a manufacturer's webpage.

Instantaneous lead processing A customer request form is normally processed after hours. The live consultation takes place immediately.

The customer can purchase his or her vehicle directly with the adviser of the live consultation.

Overall, the examples show how a digital consultation can be provided from a car

The invention claimed is:

1. A method for coupling a terminal of a user to smart glasses of a communication device of a call partner, the method comprising the following steps:

providing an internet page with a control element for establishing contact;

detecting an operation activity by the user on the control element;

contacting the communication device of the call partner;

in response to receiving an acknowledgement confirmation of the call partner received from the communication device, coupling the terminal to the smart glasses via a communication channel operated by a management server, the coupling further comprising:

detecting, by the management server, a device position (POS) of the terminal; and selecting, by the management server, the call partner from a plurality of possible call partners based on a selection criterion that evaluates the device position, wherein the possible call partners are ordered according to the selection criterion, and the ordering is based on a distance of each possible call partner from the device position with a nearest call partner listed first; and in response to not receiving the acknowledgement confirmation of the contacted call partner for a predetermined waiting period, selecting, by the management server, a next call partner according to the ordering and contacting the selected call partner's communication device, wherein the selecting the next call partner includes:

applying the least distance between the device position and the each possible call partner via the selection criterion;

taking into account a travel duration for specifying the distance; and determining the device position from a position input of the user, wherein a position different from a current position of the terminal is specified by the user.

2. The method of claim 1, wherein using the selection criterion further comprises:

applying a coverage specification of each possible call partner pertaining to a coverage area in which the device position (POS) is located.

3. The method of claim 2, further comprising taking into account a geometric distance for specifying the distance in the selection criterion.

4. The method of claim 2, further comprising:

waiting for a predetermined decision duration, after selecting the call partner and before contacting the selected call partner's communication device;

displaying a return control element to the user on the user's terminal during the waiting;

not contacting the call partner's communication device, upon detecting an actuation of the return control element on the part of the user; and contacting the call partner's communication device after the expiry of the decision duration and upon not detecting an actuation of the return control element on the part of the user.

5. The method of claim 2, wherein the steps comprising the method are performed by at least one web server that is different from the management server, and/or at least one further Internet page is provided with a control element for establishing contact with the call partner's communication device, wherein the Internet page relates to a distinct call subject, and a distinct group of possible call partners.

6. The method of claim 2, wherein, after receiving the acknowledgement confirmation, the acknowledgement confirmation is signaled to the user through a message of the management server before the communication channel is connected to the terminal.

7. The method of claim 1, wherein using the selection criterion further comprises selecting, by the user, a call partner from a list that displays at least some of the possible call partners.

8. The method of claim 1, further comprising determining the device position (POS) from an IP address of a feed server that couples the terminal to the Internet, and/or from geo-position data of a device's own receiver for a position signal of a GNSS.

9. A server system comprising at least one server, wherein the at least one server is configured as a management server for operating a communication channel between smart glasses and a terminal, and the at least one server is configured to:

provide an internet page with a control element for establishing contact;

detect an operation activity by a user on the control element;

contact a communication device of a call partner; and in response to receiving an acknowledgement confirmation of the call partner is received from the communication device, couple the terminal to the smart glasses via a communication channel operated by the management server, the coupling further comprising:

detect, by the management server, a device position (POS) of the terminal; and select, by the management server, the call partner from a plurality of possible call partners based on a selection criterion that evaluates the device position, wherein the possible call partners are ordered according to the selection criterion, and the ordering is based on a distance of each possible call partner from the device position with the nearest call partner listed first; and in response to not receiving the acknowledgement confirmation of the contacted call partner for a predetermined waiting period, select, by the management server, a next call partner according to the ordering and contacting the selected call partner's communication device, wherein the selecting the next call partner includes:

apply the least distance between the device position and the each possible call partner via the selection criterion;

take into account a travel duration for specifying the distance; and determine the device position from a position input of the user, wherein a position different from a current position of the terminal is specified by the user.

* * * * *